United States Patent [19]
Pollich et al.

[11] Patent Number: 5,243,446
[45] Date of Patent: Sep. 7, 1993

[54] ADAPTIVE CLUMPED DITHERING WITH CLUMP PLANE SEPARATION

[76] Inventors: Richard E. Pollich, 1383 Lindbergh Ave., Roslyn, Pa. 19001; Charles D. Bodson, 233 N. Columbus St., Arlington, Va. 22203

[21] Appl. No.: 920,624

[22] Filed: Jul. 21, 1992

Related U.S. Application Data

[63] Continuation of Ser. No. 483,477, Feb. 22, 1990, abandoned.

[51] Int. Cl.⁵ ............................................. H04N 1/40
[52] U.S. Cl. ..................................... 358/466; 358/467; 358/433; 358/429
[58] Field of Search ................. 358/426, 261.3, 427, 358/429, 262.1, 432, 455, 456, 457, 458, 467, 433, 466, 448

[56] References Cited

U.S. PATENT DOCUMENTS

| | | | |
|---|---|---|---|
| 4,729,035 | 3/1988 | Tanioka | 358/426 |
| 4,924,509 | 5/1990 | Yokomizo | 358/456 |
| 4,953,019 | 8/1990 | Shikakura et al. | 358/433 |

Primary Examiner—Edward L. Coles, Sr.
Assistant Examiner—Jerome Grant, III

[57] ABSTRACT

A method is provided for data compression and image enhancement in a digital facsimile document transmission system. The method permits images containing gray scale content to be reproduced using conventional facsimile equipment. An irregularly shaped matrix of thresholds is employed in an adaptive approach to convert each multilevel gray scale pixel to a bilevel (black/white) pixel. The adaptive thresholding approach employed provides improved image quality in images containing both gray scale and high contrast information, e.g., identification cards. Compression performance is enhanced by an image rearrangement process in which pixels thresholded with similar threshold values are grouped together prior to run length encoding.

8 Claims, 4 Drawing Sheets

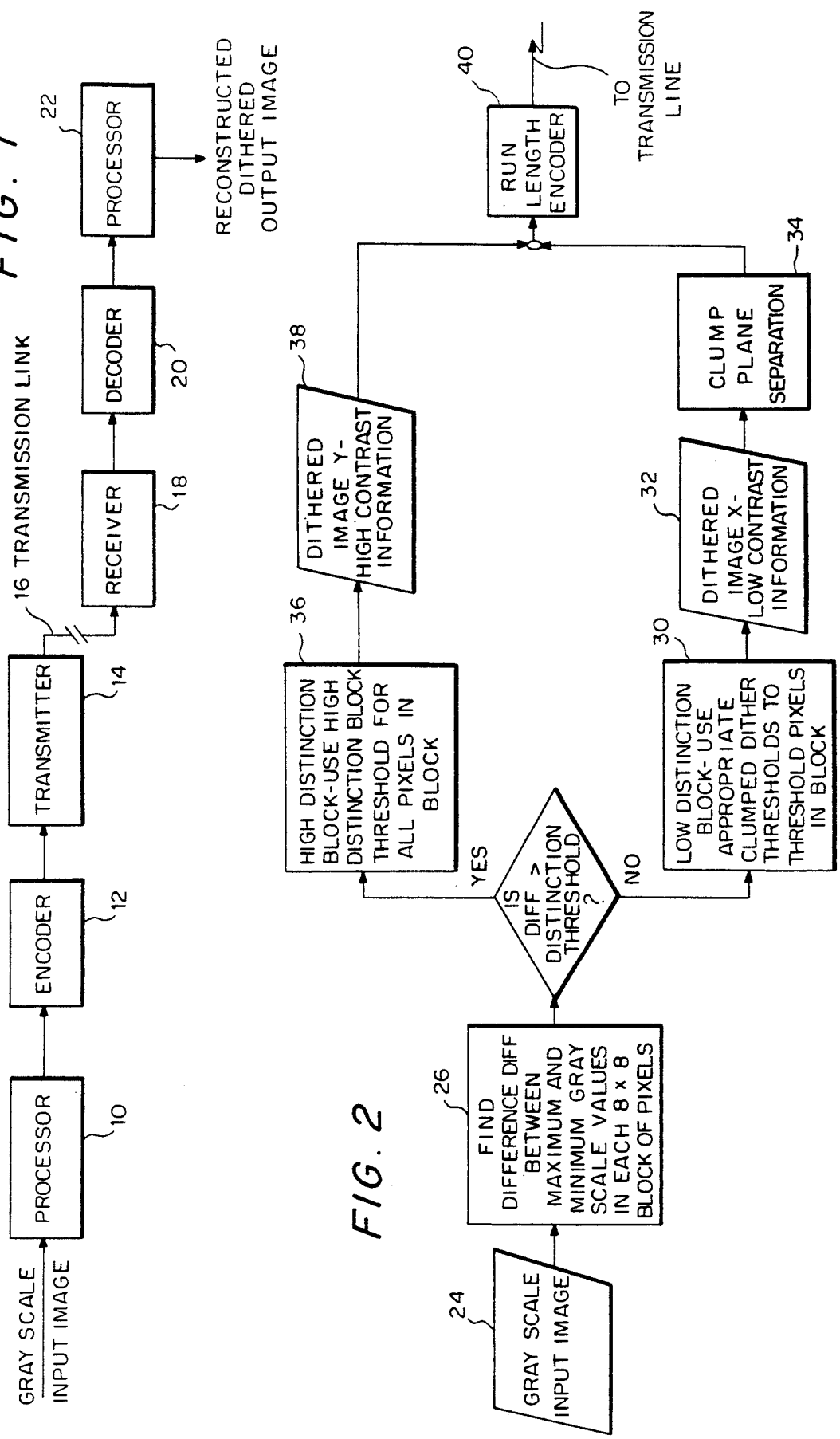

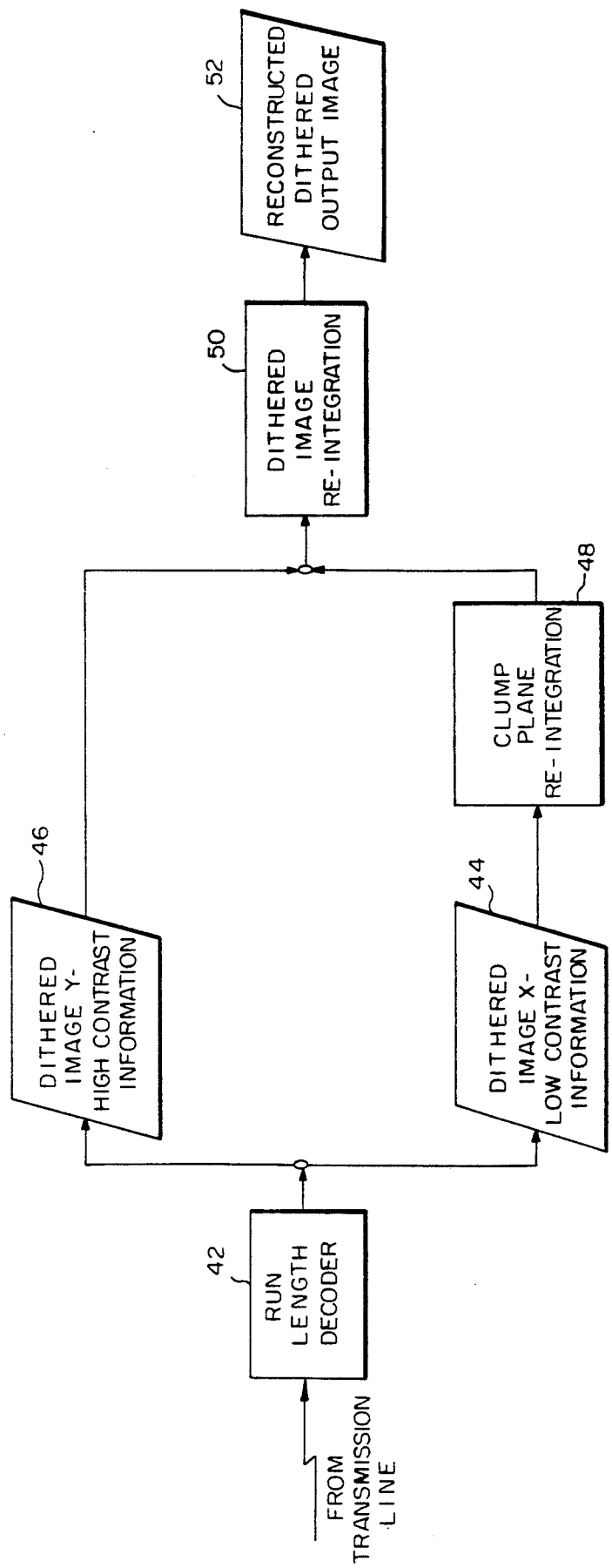

| 242 | 232 | 167 | 200 | 230 |
|-----|-----|-----|-----|-----|
| 230 | 210 | 94  | 72  | 153 |
| 153 | 111 | 36  | 52  | 193 |
| 192 | 216 | 181 | 126 | 222 |
| 222 | 242 | 232 | 167 | 200 |

M

ADAPTIVE CLUMPED DITHERING WITH CLUMP PLANE SEPARATION

This is a continuation of application Ser. No. 07/483,447, filed Feb. 22, 1990, now abandoned.

FIELD OF THE INVENTION

The present invention relates to digital facsimile document transmission and more particularly, a method for providing data compression and image enhancement in the facsimile transmission of images with gray scale content.

BACKGROUND OF THE INVENTION

The transmission of images containing gray scale information using existing facsimile equipment has been the subject of considerable research. There are many techniques for transforming a multilevel gray scale image to a binary approximation of that image. Dither coding and superpel coding are two of the most effective and most widely used techniques for accomplishing this. Superpel coding employs an n × n matrix of bi-level pixels to approximate each multilevel gray scale pixel in the image. Dither coding employs one or more thresholds and each multilevel gray scale pixel in the image is compared to one of the thresholds to produce a single bilevel pixel.

The principal advantage of dither coding as compared with superpel coding is that a dithered image realizes an N to 1 reduction in information over the N bit gray scale image, while an image produced by superpel coding realizes an (n × n) to N information expansion (where n ≥ 3).

There are several dither coding techniques available, including random dithering, clumped dithering, and ordered dithering. In random dithering, each multilevel gray scale pixel is compared with a threshold selected randomly from the dynamic range of the image. Ordered dithering employs a rectangular matrix of fixed thresholds; each multilevel gray scale pixel in the image is compared to one of the thresholds in the rectangular matrix. The thresholds are arranged in the matrix so as to produce a set of pseudo-gray levels by varying the ratio of black to white pixels in the matrix.

Clumped dithering is an electronic approximation of the photomechanical screening process and employs an irregularly shaped matrix of fixed thresholds. The thresholds are arranged so that a "dot" grows outward from the center of the matrix as successively darker shades of gray are encountered in the image. Clumped dithering produced dithered images that, in general, contain more contrast and better pseudo-gray scale rendition than images produced by either random or ordered dithering.

There are several drawbacks to employing dither coding for transmitting gray scale images using existing facsimile equipment. A dithered image contains a large amount of short black and white pixel runs, and this limits the effectiveness of the Modified Huffman and Modified READ compression techniques employed in typical facsimile machines. Further, dither coding of images containing an appreciable amount of high contrast information (e.g., text) causes severe distortion of the high contrast information in the dithered image.

Patents of interest in this field include the following U.S. Pat. Nos. 3,967,052 (Judice); 4,549,220 (Suzuki); 4,593,325 (Kannapell et al); 4,606,069 (Johnson); 4,468,704 (Stoffel et al); 4,631,521 (El-Sherbini); 4,651,287 (Tsao); 4,663,662 (Sekizawa et al); 4,675,831 (Ito et al); 4,766,499 (Inazuka); 4,782,400 (Ohtani); and 4,783,841 (Crayson). Briefly considering these references, the Judice patent discloses an image transmission method which processes a gray scale image by scanning every fourth pixel along a scan line, thresholding the scanned pixels using one of the thresholds in a 4×4 matrix of thresholds, and placing the resulting dithered quarter-scan line in the output stream. The second quarter-scan line begins at the second pixel in the scan line, and the next threshold in the dither matrix (along the matrix row) is used to threshold the gray scale pixels. This processing continues until the entire scan line has been processed. The next scan line uses the next row in the dither matrix, and after every fourth scan line the matrix is repeated.

The Stoffel et al patent discloses an adaptive thresholder which employs a single threshold that is modified as each pixel in the image is processed. The system does not distinguish between bi-level and gray scale image content.

The Suzuki patent discloses a technique for processing image data into binary data wherein a gray scale image is processed by comparing the analog input signal to a predetermined reference o voltage and to an operator-supplied threshold command signal to select between a fixed or dither thresholding scheme. This method distinguishes between gray scale and bi-level information, but does so on a per pixel basis. Further, this technique does not take into account the local spatial characteristics of the image.

The Kannapell et al patent discloses an adaptive thresholding algorithm which processes a gray scale image in 216 pixel segments along each scan line. From each segment, a background threshold, a print threshold, and a contrast threshold are first determined. From these thresholds an estimated threshold is calculated. From neighboring segment adaptive threshold values an average threshold value for the current segment is determined. The adaptive threshold value for the current segment is then derived from the difference between the average and estimated thresholds.

The El-Sherbini patent discloses a differential run-length coding method which employs an 8×8 ordered dither threshold matrix to binarize the image, regardless of image content, and a reference byte differentiation technique to increase the compressibility of the dithered image. The byte differentiation technique selects a reference byte on each scan line and performs an exclusive-OR operation with the reference byte and each byte in the scan line. This method increases the length of the black and white pixel run lengths in the dithered image.

The Tsao patent discloses a digital image processing algorithm which involves reproducing continuous tone images on output devices with lower or discrete dynamic ranges by converting the local input image densities into output device densities (using a tone reproduction curve) and then performing an iterative local error minimization calculation on n×n block of pixels. This algorithm does not distinguish between bi-level and gray scale information.

The Sckizawa et al patent discloses a picture signal processing system employing an algorithm which provides for switching between a single binarization step and a dither binarization step. More particularly, the algorithm employs a sum-of-products convolution per-formed on 5×5 blocks of picture elements to determine the local "density" of the picture which, in turn, is used to switch between a single threshold binarization step and a 4×4 ordered dither threshold matrix binarization step.

The Ito et al patent discloses a method for processing gradation information which employs a group of 8×8 matrices of thresholds and adaptively generated gradation statistics to process an image. The disclosed method does not distinguish between bi-level and gray scale image content and is not concerned with improvement of the compression of the dithered image.

The Inazuka patent discloses a dither signal encoder-decoder system which is designed to improve compression performance, and employs a predictive technique to produce a transposition signal with a higher run length coding efficiency than the original dither signal.

The Ohtani patent discloses an analog video signal encoder-decoder system which employs a simple n x n matrix of thresholds to process an image and does not distinguish between bi-level and gray scale image content. The system increases the run-length coding efficiency of the resulting thresholded (dithered) image by converting the dithered data, which typically consists of short runs of black and white pixels, into a binary stream with longer runs of black and white pixels using an exclusive OR operation on each $n-1$ pixels.

The Johnson and Caryson patents disclose data compression techniques of general interest and are not concerned with dither coding.

SUMMARY OF THE INVENTION

In accordance with the present invention, an improved method of digital facsimile transmission and reception of pseudo-gray scale images is provided. Generally speaking, the method employs an adaptive approach for switching between two different thresholding techniques, depending on the content of blocks of pixels which together make up the input image. More particularly, the invention distinguishes between bi-level and gray scale image content and employs a fixed, irregularly shaped matrix of thresholds (which simulates the photo-mechanical screening process) in processing gray scale information and a single fixed threshold in processing bi-level information. A further aspect of the invention involves increasing the run length coding efficiency of the dithered image by separating the bi-level information from pseudo-gray scale information and then reordering the pseudo-gray scale information, prior to encoding, using a "clump plane" separation step described hereinbelow.

According to a -referred embodiment of the invention, a method is provided for processing a document image having gray scale content to enable transmitting of the image using a digital facsimile document transmission system, the method comprising: (i) dividing an input image having gray scale content into blocks of n×n pixels and determining the difference between maximum and minimum gray scale values in each block; (ii) comparing the difference for each block with a predetermined distinction threshold to thereby separate the blocks into high distinction blocks wherein the difference exceeds the predetermined threshold and low distinction blocks wherein that difference is less than or equal to that threshold; (iii) comparing all of the pixels of the high distinction blocks with a single fixed intensity threshold to thereby produce thresholded high distinction blocks of bilevel pixels; (iv) comparing each of the pixels of the low distinction blocks with a corresponding intensity threshold of an irregularly shaped matrix of a plurality of fixed intensity thresholds to thereby convert each multilevel gray scale pixel of the low distinction blocks into a bilevel pixel and to thereby produce thresholded low distinction blocks of the bilevel pixels produced by the conversion of the gray scale pixels; and (v) run length encoding the bilevel pixels resulting from steps (iii) and (iv) and transmitting the resultant encoded data.

As mentioned above, a further important aspect of the invention involves the clumping or grouping together the pixels of the low distinction blocks that are compared with a similar threshold value, prior to the run length encoding step, to thereby improve the compression performance of the system.

Preferably, the matrix is interlaced with a plurality of like matrices in providing thresholding of the pixels of the low distinction blocks to thereby produce low distinction dithered blocks. Advantageously, a low distinction dithered image is produced by placing the low distinction dithered blocks in the low distinction dithered image at the relative positions that the low distinction blocks occupy in the input image and by placing all white n×n blocks in the low distinction dithered image at the same relative positions that the high distinction blocks occupy in the input image. Similarly, a high distinction dithered image is produced by placing the thresholded high distinction blocks in the high distinction dithered image at the relative positions that the high distinction blocks occupy in the input image and by placing all white n×n blocks in the high distinction dithered image at the same relative positions that the low intensity blocks occupy in the input image.

Processing of the transmitted data at a receiver preferably comprises run length decoding the transmitted data, separating the decoded data into high contrast and low contrast information, processing the low contrast information so as to reintegrate the grouped pixels of the step above, and reintegrating the high and low contrast information to produce a reconstructed dithered output image.

Other features nd advantages of the invention will be set forth in, or apparent from, the following detailed description of preferred embodiment of the invention.

BRIEF DESCRIPTION OF THE DRAWINGS

FIG. 1 is a block diagram of the basic components of a digital facsimile document transmission system in which the method of the invention is incorporated;

FIG. 2 is a block diagram of the basic processing steps used in encoding a gray scale input image for transmission in accordance with the method of the invention;

FIG. 3 is a block diagram of the basic steps used in decoding the transmission of FIG. 2 and in reconstructing the clump dithered image at the receiver;

DESCRIPTION OF THE PREFERRED EMBODIMENTS

Figures 4, 5:
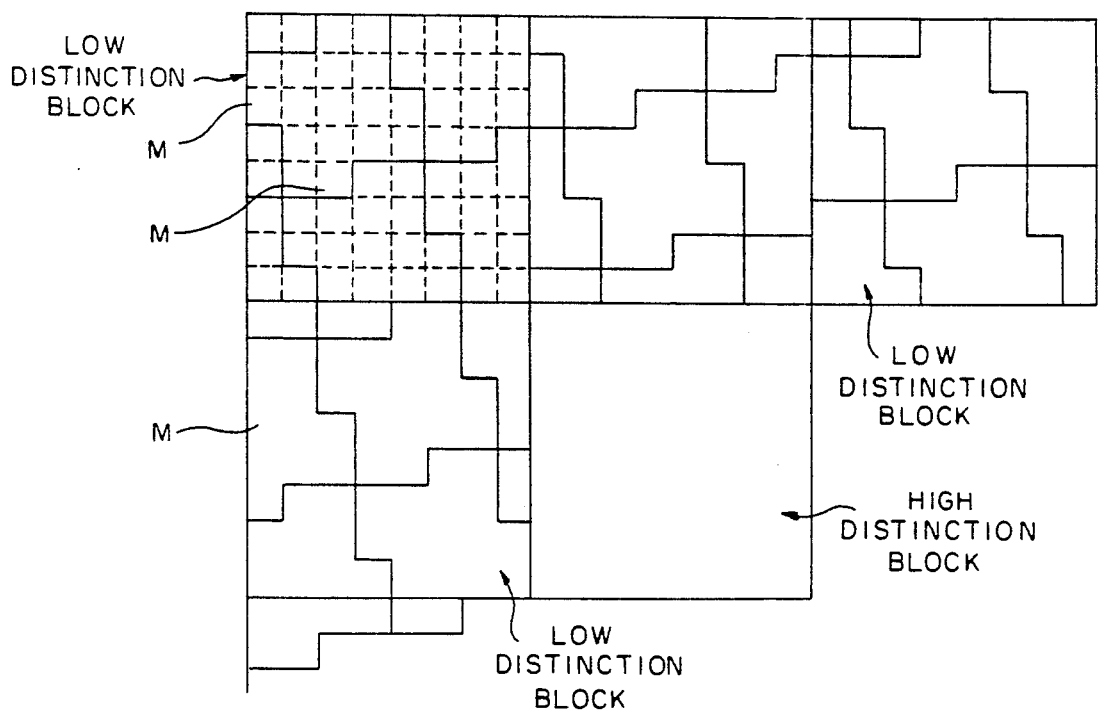
FIG. 4 is a representation of an exemplary clumped dither thresholding matrix employed in accordance with the method of the invention.
FIG. 5 illustrates a lattice formed by matrices corresponding to that shown in FIG. 4, as well as the high and low distinction blocks.

Referring first to FIG. 1, there are shown the basic units or components of a digital document facsimile transmission system to which the method of the invention can be applied. The system includes a processor 10 which, explained below, receives an input image having gray scale content, an encoder 12, a transmitter 14, a transmission link 16, a receiver 18, a decoder 20 and a processor 22 which, as is also explained below, produces a reconstructed dithered output image. It will be appreciated that the units just described are conventional and that the present invention basically involves the manner in which the input image is processed.

Referring to FIGS. 2 and 3, block diagrams in the nature of a flow chart are shown which illustrate the basic encoding (FIG. 1) and decoding (FIG. 2) steps in accordance with the adaptive clumped dithering method of the invention. As discussed above, the method of the invention, which, according to one aspect thereof, provides clump plane separation, uses an adaptive technique for switching between two different thresholding schemes depending, as discussed below, on the difference between the maximum and minimum intensity values of a block of pixels, and also employs an image rearrangement technique in which the dithered image (produced by one of the two thresholding schemes) is separated into "clump planes" prior to conventional run length encoding.

As illustrated in FIG. 2, a gray scale input image, represented by input box 24, is processed in 8×8 blocks of pixels. In particular, as indicated by processing box 26, for each 8×8 block the difference between the maximum and minimum gray scale values, referred to as the block distinction, is determined. This block distinction value is then compared, as indicated by decision box or diamond 28, to a block distinction threshold specified by the operator. If the block distinction value exceeds the threshold, the block is categorized as a high distinction block; otherwise, the block is categorized as a low distinction block. The high contrast (high distinction) information is thus separated from the lower contrast (low distinction) information so that the high contrast information can be thresholded with a different, more appropriate technique as discussed below.

Considering the processing of the low distinction blocks, these blocks, in general, contain appreciable gray scale content. As indicated by processing box 30, these low distinction blocks are thresholded using a clumped dither threshold matrix. An exemplary matrix is illustrated in FIG. 4 and is denoted M in that figure. As is evident from FIG. 4, the thresholds (represented by the number values shown) in the irregularly shaped matrix M are arranged so that a "dot" grows outward from the center as successively darker gray shades are encountered in the gray scale image As a result, this technique electronically emulates the photomechanical screening process. In the exemplary matrix illustrated, seventeen different thresholds are provided.

As illustrated in FIG. 5, individual irregularly shaped matrices M, corresponding to that shown in FIG. 4, interlock to form a lattice within the low distinction blocks. FIG. 5 also illustrates, in dashed lines, in the low distinction block in the left hand corner, the 64 pixels of the 8×8 block. When the distinction of a block is determined to be low, the thresholds in the 8×8 matrix are determined by the position of the block in the lattice, as should be evident from comparing adjacent low distinction blocks. The gray scale pixels in the 8×8 input block are compared to the corresponding thresholds of the 8×8 matrix, and the dithered block is placed into a low distinction dithered image X. On the other hand, an all white 8×8 block is placed in the relative position of the block in the high distinction dithered image Y.

Turning to the processing of the high distinction blocks, these blocks are characterized by high contrast information such as appears in text or line drawings. When the distinction of a block is determined to be high using the initial thresholding techniques described above in considering FIG. 2, each pixel in the 8×8 input block is then thresholded with a single, operator-specified high distinction block threshold as indicated by processing box 36. It will be appreciated that by using a single threshold, instead of a matrix of thresholds, the "graying" of the high contrast edges is largely avoided. As indicated by output box 38, the thresholded high distinction block is placed into the high distinction dithered image Y, and an all white 8×8 block is placed in the relative position of the block in the low distinction dithered image X, as illustrated in FIG. 5.

Figure 6:
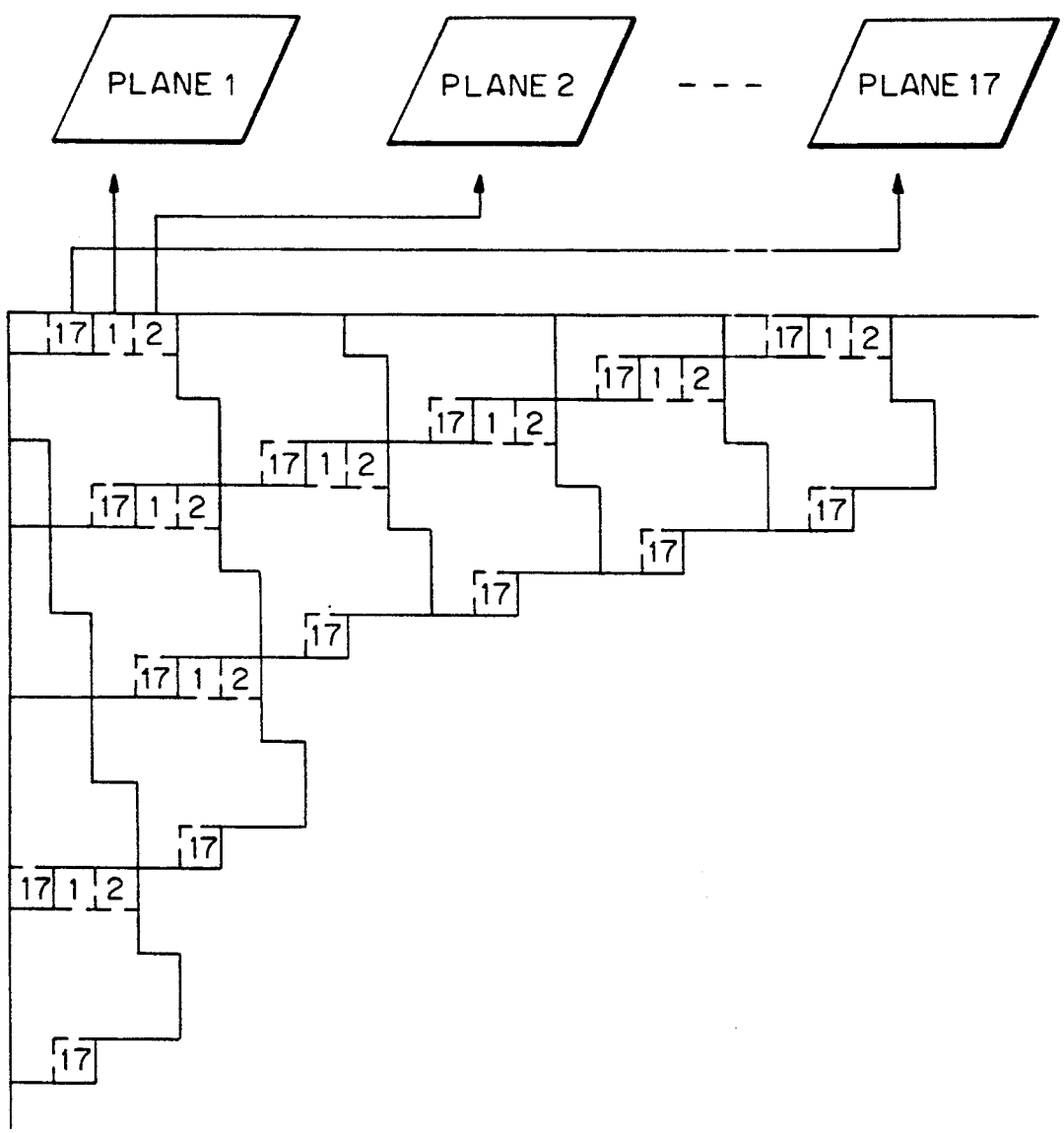
FIG. 6 illustrates the clumped plane separation step provided in accordance with the invention.

At this point, the dithered image Y contains typical facsimile information, and thus can be run length encoded and transmitted directly in a conventional manner. The dithered image X, on the other hand, contains an appreciable amount of dithered information, and thus requires further processing in order to improve the compressibility thereof. The processing involves the clump plane separation technique referred to above. In particular, referring to FIG. 6 the clump plane separation step extracts all pixels thresholded with clump threshold 1 and places them into Clump Plane 1, all pixels thresholded with clump threshold 2 and places them into Clump Plane 2, and so on, for all seventeen thresholds, as indicated in FIG. 6. (It is noted that the pixels in the all white blocks, representing high distinction blocks, are treated as low distinction dithered pixels). The seventeen resulting clump planes are then run length encoded and transmitted as indicated by processing box 40 in FIG. 2. It will be understood that by placing all of the pixels thresholded with the same threshold together, the average black and white run lengths are increased, thus improving compression.

Turning now again to FIG. 3, in the decoder the dithered image Y and the seventeen image X clump planes are run length decoded, as indicated by processing box 42 in FIG. 3, and separated into dithered images X and Y as indicated by output boxes 44 and 46, respectively. The clump planes are then reintegrated, as indicated by processing box 48, to exactly reconstruct Image X by placing the clump plane pixels back in their original positions. The high distinction blocks are extracted from Image Y and re-integrated with the low distinction blocks in Image X as indicated by processing box 50 to reconstruct the clumped dithered image at the receiver. This reconstructed dithered output image is represented by output box 52 in FIG. 3.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A method for processing a document image having gray scale content to enable transmitting of the image using a digital facsimile document transmission system, said method comprising:

(i) dividing an input image having gray scale content into blocks of n×n pixels and determining the difference between maximum and minimum gray scale values in each block;

(ii) comparing the difference for each block with a predetermined distinction threshold to thereby separate the blocks into high distinction blocks wherein said difference exceeds said predetermined threshold and low distinction blocks wherein said difference is less than or equal to said predetermined threshold;

(iii) comparing all of the pixels of the high distinction blocks with a single fixed intensity threshold to thereby produce thresholded high distinction blocks of bilevel pixels;

(iv) comparing each of the pixels of the low distinction blocks with a corresponding intensity threshold of an irregularly shaped matrix of a plurality of fixed intensity thresholds to thereby convert each multilevel gray scale pixel of the low distinction blocks into a bilevel pixel and to thereby produce thresholded low distinction blocks of the bilevel pixels produced by the conversion of the gray scale pixels; and (v) run length encoding the bilevel pixels resulting from steps (iii) and (iv) and transmitting the resultant encoded data.

2. A method as claimed in claim 1 wherein a high distinction dithered image is produced by placing the thresholded high distinction blocks in the high distinction dithered image at the relative positions that the high distinction blocks occupy in the input image and by placing all white n×n blocks in the high distinction dithered image at the same relative positions that the low intensity blocks occupy in the input image.

3. A method for processing a document image having gray scale content to enable transmitting of the image using a digital facsimile document transmission system, said method comprising:

(i) dividing an input image having gray scale content into blocks of n×n pixels and determining the difference between maximum and minimum gray scale values in each block;

(ii) comparing the difference for each block with a predetermined distinction threshold to thereby separate the blocks into high distinction blocks wherein said difference exceeds said predetermined threshold and low distinction blocks wherein said difference is less than or equal to said predetermined threshold;

(iii) comparing all of the pixels of the high distinction blocks with a single fixed intensity threshold to thereby produce thresholded high distinction blocks of bilevel pixels;

(iv) comparing each of the pixels of the low distinction blocks with a corresponding intensity threshold of an irregularly shaped metric of a plurality of fixed intensity thresholds to thereby convert each multilevel gray scale pixel of the low distinction blocks into a bilevel pixel, said matrix being interlaced with a plurality of like matrices in providing thresholding of the pixels of the low distinction blocks to thereby produce low distinction dithered blocks wherein a low distinction dithered image is produced by placing the low distinction dithered blocks in the low distinction dithered image at the relative position that the low distinction blocks occupy in the input image and by placing all white n×n blocks in the low distinction dithered image at the same relative positions that the high distinction blocks occupy int he input image; and (v) run length encoding the bilevel pixels resulting from steps (iii) and (iv) and transmitting the resultant encoded data.

4. A method as claimed in claim 3 wherein the method further comprises (vi) grouping together the pixels of the low distinction blocks that are compared with a similar threshold value, prior to the run length encoding step, to thereby improve compression performance of the system.

5. A method as claimed in claim 4 wherein the bilevel pixels resulting from steps (iii) and (iv) are combined prior to run length encoding.

6. A method as claimed in claim 4 further comprising run length decoding the transmitted data, separating the decoded data into high contrast and low contrast information, processing the low contrast information so as to reintegrate the grouped pixels of step (vi), and reintegrating the high and low contrast information to produce a reconstructed dithered output image.

7. A method for processing a document image having gray scale content to enable transmitting and receiving of the image using a digital facsimile document transmission system, said method comprising:

(i) dividing an input image having gray scale content into blocks of n×n pixels and determining the difference between maximum and minimum gray scale values in each block;

(ii) comparing the difference for each block with a predetermined distinction threshold to thereby separate the blocks into high distinction blocks wherein said difference exceeds said predetermined threshold and low distinction blocks wherein said difference is less than or equal to said predetermined threshold;

(iii) comparing all of the pixels of the high distinction blocks with a single fixed intensity threshold to thereby produce thresholded high distinction blocks of bilevel pixels;

(iv) comparing each of the pixels of the low distinction blocks with a corresponding intensity threshold of an irregularly shaped metric of a plurality of fixed intensity thresholds to thereby convert each multilevel gray scale pixel of the low distinction blocks into a bilevel pixel wherein said matrix is interlaced with a plurality of like matrices in providing thresholding of the pixels of the low distinction blocks and placing said low distinction dithered blocks in the low distinction dithered image at the relative positions that the low distinction blocks occupy in the input image and by placing all white n×n blocks in the low distinction dithered image at the same relative positions that the high distinction blocks occupy in the input image to thereby produce low distinction dithered blocks;

(v) grouping together the pixels of the low distinction blocks that are compared with a similar threshold value;

(vi) combining the bilevel pixels resulting form steps (iii) and (v);

(vii) run length encoding the bilevel pixels resulting from steps (iii) and (v) and transmitting the resultant encoded data;

(viii) run length decoding the transmitted data;
(ix) separating the decoded data into high contrast and low contrast information;
(x) processing the low contrast information so as to reintegrate the grouped pixels of step v; and
(xi) reintegrating the high contrast information and the low contrast information as processed in step (x) to produce a reconstructed dithered output image.

8. A method as claimed in claim 7 wherein a high distinction dithered image is produced by placing the thresholded high distinction blocks in the high distinction dithered image at the relative positions that the high distinction blocks occupy in the input image and by placing all white $n \times n$ blocks in the high distinction dithered image at the same relative positions that the low intensity blocks occupy in the input image.

* * * * *